United States Patent
Cho

(10) Patent No.: US 12,187,164 B2
(45) Date of Patent: Jan. 7, 2025

(54) APPARATUS AND METHOD FOR PERFORMING REGENERATIVE BRAKING BY CONTROLLING DISCONNECTOR OF FOUR-WHEEL DRIVE VEHICLE

(71) Applicants: HYUNDAI MOTOR COMPANY, Seoul (KR); Kia Corporation, Seoul (KR)

(72) Inventor: Woo Cheol Cho, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 420 days.

(21) Appl. No.: 17/681,108

(22) Filed: Feb. 25, 2022

(65) Prior Publication Data
US 2022/0402366 A1    Dec. 22, 2022

(30) Foreign Application Priority Data

Jun. 22, 2021    (KR) .......................... 10-2021-0081146

(51) Int. Cl.
*B60L 7/18*    (2006.01)

(52) U.S. Cl.
CPC ........... *B60L 7/18* (2013.01); *B60L 2240/465* (2013.01); *B60L 2250/26* (2013.01)

(58) Field of Classification Search
None
See application file for complete search history.

(56) References Cited

U.S. PATENT DOCUMENTS

| | | | | |
|---|---|---|---|---|
| 6,131,686 A * | 10/2000 | Scotti | ..................... | B60K 23/08 192/69.82 |
| 7,572,201 B2 * | 8/2009 | Supina | ..................... | B60L 50/61 475/5 |
| 2005/0151420 A1 * | 7/2005 | Crombez | ................. | B60K 6/44 903/947 |
| 2005/0230174 A1 * | 10/2005 | Fukuda | ............. | B60R 21/01546 180/268 |
| 2006/0102395 A1 * | 5/2006 | Yamamoto | ............ | B60W 10/08 180/65.285 |
| 2007/0193808 A1 * | 8/2007 | Perakes | ................. | B60W 10/02 180/65.265 |
| 2011/0172863 A1 * | 7/2011 | Yu | ........................... | G16Z 99/00 180/65.285 |
| 2012/0325573 A1 * | 12/2012 | Miller | ..................... | B60L 50/16 180/282 |

(Continued)

FOREIGN PATENT DOCUMENTS

| | | | | |
|---|---|---|---|---|
| CN | 1640739 A | * | 7/2005 | ............... B60K 6/48 |
| CN | 111251904 A | * | 6/2020 | .......... B60L 15/2009 |

(Continued)

*Primary Examiner* — Justin S Lee
(74) *Attorney, Agent, or Firm* — MORGAN, LEWIS & BOCKIUS LLP

(57) ABSTRACT

An apparatus for performing regenerative braking by controlling a disconnector of a vehicle includes a computing device to calculate a braking amount necessary for braking, a controller to engage or release the disconnector of the vehicle, based on the calculated braking amount, and a distributing device to distribute a regenerative braking amount necessary for braking into at least one motor included in the vehicle, when the disconnector is engaged or released.

14 Claims, 5 Drawing Sheets

(56) References Cited

U.S. PATENT DOCUMENTS

| | | | |
|---|---|---|---|
| 2013/0218381 A1* | 8/2013 | Shinohara | B60K 6/52 |
| | | | 701/22 |
| 2017/0066331 A1* | 3/2017 | Jeon | B60T 8/4081 |
| 2018/0086209 A1* | 3/2018 | Jeon | B60T 8/17 |
| 2019/0126759 A1* | 5/2019 | Miller | B60L 15/009 |
| 2020/0180577 A1* | 6/2020 | Buell | B60T 8/1706 |
| 2024/0166055 A1* | 5/2024 | Maruyama | B60L 7/26 |

FOREIGN PATENT DOCUMENTS

| | | | | |
|---|---|---|---|---|
| CN | 111284495 A | * | 6/2020 | |
| CN | 112477610 A | * | 3/2021 | B60L 7/18 |
| CN | 112677771 A | * | 4/2021 | |
| JP | 2006211818 A | * | 8/2006 | |
| JP | 2018033290 A | * | 3/2018 | |

\* cited by examiner

APPARATUS AND METHOD FOR PERFORMING REGENERATIVE BRAKING BY CONTROLLING DISCONNECTOR OF FOUR-WHEEL DRIVE VEHICLE

CROSS-REFERENCE TO RELATED APPLICATION

This application claims the benefit of priority to Korean Patent Application No. 10-2021-0081146, filed on Jun. 22, 2021 in the Korean Intellectual Property Office, the entire contents of which are incorporated herein by reference.

TECHNICAL FIELD

The disclosure relates to an apparatus for performing regenerative braking by controlling a disconnector of a four-wheel vehicle.

BACKGROUND

In general, a four-wheel drive electric vehicle, a hybrid car, or a plug-in hybrid car utilizes regenerative braking through a battery for a vehicle to improve the energy efficiency or the fuel efficiency of the vehicle. However, when the regenerative braking is indiscriminately used in braking of the vehicle, the fuel efficiency may be degraded or the braking may be unstable. Accordingly, the regenerative braking should be properly performed based on the braking condition of the vehicle.

In addition, the four-wheel drive vehicle includes a disconnector to transmit driving force, which is generated from a motor, to a front wheel or rear wheel of the vehicle. In such a vehicle, when a regenerating braking amount resulting from braking is not properly distributed into the front wheel or the rear wheel by controlling the disconnector, the fuel efficiency may be degraded or the braking may be unstable.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides an apparatus or a method for properly performing regenerative braking based on a braking condition of a vehicle.

Another aspect of the present disclosure provides an apparatus or a method for properly distributing regenerative braking into a front wheel or a rear wheel by controlling a disconnector of a vehicle.

The technical problems to be solved by the present disclosure are not limited to the aforementioned problems, and any other technical problems not mentioned herein will be clearly understood from the following description by those skilled in the art to which the present disclosure pertains.

According to embodiments, an apparatus for performing regenerative braking by controlling a disconnector of a vehicle may include a computing device to calculate a braking amount necessary for braking, in response to inputting braking into the vehicle, a controller to engage or release the disconnector of the vehicle, based on the calculated braking amount, and a distributing device to distribute a regenerative braking amount necessary for braking into at least one motor included in the vehicle, when the disconnector is engaged or released.

In addition, according to embodiments, the controller may engage the disconnector, when at least one of a first condition or a second condition is satisfied, and release the disconnector, when each of the first condition and the second condition is not satisfied.

In addition, according to embodiments, the controller may engage or release the disconnector, based on at least one of the calculated braking amount, the speed of manipulating the brake pedal, or the energy recovery amount based on the regenerative braking necessary for braking. The first condition may be satisfied based on at least one of the calculated braking amount or the speed of manipulating the brake pedal, and the second condition may be satisfied based on an energy recovery amount based on the regenerative braking.

In addition, according to embodiments, the first condition may be satisfied when the speed of manipulating the brake pedal is greater than the first value, and the calculated braking amount is less than or equal to the second value, may be satisfied when the calculated braking amount is greater than the second value and less than or equal to the third value, may not be satisfied when the calculated braking amount is greater than the third value, and may not be satisfied when the speed of manipulating the brake pedal is less than or equal to the first value, and the calculated braking amount is less than or equal to the second value.

In addition, according to embodiments, the vehicle may include the first motor and the second motor, and each of the first motor and the second motor may drive any one of a front wheel or a rear wheel. The energy recovery amount based on the regenerative braking may include an energy recovery amount based on the regenerative braking of any one of the first motor or the second motor, and/or an energy recovery amount based on the regenerative braking of the first motor and the second motor. The second condition may be satisfied, when the energy recovery amount based on the regenerative braking of the first motor and the second motor is greater than the energy recovery amount of any one of the first motor or the second motor.

In addition, according to embodiments, the distributing device may allocate the regenerative braking amount necessary for braking to any one of the first motor or the second motor, when the disconnector is released.

In addition, according to embodiments, the distributing device may distribute the regenerative braking amount into the first motor and the second motor, based on a desired regenerative braking amount of the first motor and a desired regenerative braking amount of the second motor, when the disconnector is engaged, and the deceleration of the vehicle is less than or equal to the fourth value. The desired regenerative braking amount of the first motor and the desired regenerative braking amount of the second motor may be generated based on the calculated braking amount, the energy recovery amount based on the regenerative braking of the first motor, and the energy recovery amount based on the regenerative braking of the second motor.

In addition, according to embodiments, the distributing device may distribute the regenerative braking amount into the first motor and the second motor, based on a maximum-allowed regenerative braking amount of the first motor and a maximum-allowed regenerative braking amount of the second motor, when the disconnector is engaged, and the deceleration of the vehicle is greater than the fourth value. The maximum-allowed regenerative braking amount of the first motor and the maximum-allowed regenerative braking amount of the second motor may be generated, based on the normal force applied to the front wheel of the vehicle and the normal force applied to the rear wheel of the vehicle.

Further, according to embodiments, the controller may engage the disconnector, when the disconnector is released and, a wheel slip of the vehicle occurs.

In addition, according to embodiments, the distributing device may distribute the regenerative braking amount into the first motor and the second motor, based on a maximum-allowed regenerative braking amount of the first motor and a maximum-allowed regenerative braking amount of the second motor, when the disconnector is engaged, the deceleration of the vehicle is less than or equal to the fourth value, or the wheel sleep occurs in the vehicle. The maximum-allowed regenerative braking amount of the first motor and the maximum-allowed regenerative braking amount of the second motor may be generated, based on the normal force applied to the front wheel of the vehicle and the normal force applied to the rear wheel of the vehicle.

In addition, according to embodiments, a method for performing regenerative braking by controlling a disconnector of a fourth-wheel vehicle may include calculating a braking amount necessary for braking, in response to inputting braking into a vehicle, engaging or releasing a disconnector of the vehicle, based on the calculated braking amount, and distributing the regenerative braking amount necessary for the braking into at least one motor included in the vehicle, when the disconnector is engaged or released.

In addition, according to embodiments, the engaging or releasing of the disconnector of the vehicle may include engaging the disconnector, when at least one of a first condition or a second condition is satisfied, and releasing the disconnector, when each of the first condition and the second condition is not satisfied.

In addition, according to embodiments, the engaging or releasing of the disconnector of the vehicle may include engaging or release the disconnector, based on at least one of the calculated braking amount, the speed of manipulating the brake pedal, or the energy recovery amount based on the regenerative braking necessary for braking. The first condition may be satisfied based on at least one of the calculated braking amount or the speed of manipulating the brake pedal, and the second condition may be satisfied based on an energy recovery amount based on the regenerative braking.

In addition, according to embodiments, the first condition may be satisfied when the speed of manipulating the brake pedal is greater than the first value, and the calculated braking amount is less than or equal to the second value, may be satisfied when the calculated braking amount is greater than the second value and less than or equal to the third value, may not be satisfied when the calculated braking amount is greater than the third value, and may not be satisfied when the speed of manipulating the brake pedal is less than or equal to the first value, and the calculated braking amount is less than or equal to the second value.

In addition, according to embodiments, the vehicle may include the first motor and the second motor, and each of the first motor and the second motor may drive any one of a front wheel or a rear wheel. The energy recovery amount based on the regenerative braking may include an energy recovery amount based on the regenerative braking of any one of the first motor or the second motor, and/or an energy recovery amount based on the regenerative braking of the first motor and the second motor. The second condition may be satisfied, when the energy recovery amount based on the regenerative braking of the first motor and the second motor is greater than the energy recovery amount of any one of the first motor or the second motor.

In addition, according to embodiments, the distributing of the regenerative braking amount may include allocating the regenerative braking amount necessary for braking to any one of the first motor or the second motor, when the disconnector is released.

In addition, according to embodiment, the distributing of the regenerative braking amount may include distributing the regenerative braking amount into the first motor and the second motor, based on a desired regenerative braking amount of the first motor and a desired regenerative braking amount of the second motor, when the disconnector is engaged, and the deceleration of the vehicle is less than or equal to the fourth value. The desired regenerative braking amount of the first motor and the desired regenerative braking amount of the second motor may be generated based on the calculated braking amount, the energy recovery amount based on the regenerative braking of the first motor, and the energy recovery amount based on the regenerative braking of the second motor.

In addition, according to embodiments, the distributing may include distributing the regenerative braking amount into the first motor and the second motor, based on a maximum-allowed regenerative braking amount of the first motor and a maximum-allowed regenerative braking amount of the second motor, when the disconnector is engaged, and the deceleration of the vehicle is greater than the fourth value. The maximum-allowed regenerative braking amount of the first motor and the maximum-allowed regenerative braking amount of the second motor may be generated, based on the normal force applied to the front wheel of the vehicle and the normal force applied to the rear wheel of the vehicle.

In addition, according to embodiments, the engaging or releasing of the disconnector of the vehicle may include engaging the disconnector, when the disconnector is released, and the wheel sleep occurs in the vehicle.

In addition, according to embodiments, the distributing includes distributing the regenerative braking amount into the first motor and the second motor, based on a maximum-allowed regenerative braking amount of the first motor and a maximum-allowed regenerative braking amount of the second motor, when the disconnector is engaged, the deceleration of the vehicle is less than or equal to the fourth value, or the wheel sleep occurs in the vehicle. The maximum-allowed regenerative braking amount of the first motor and the maximum-allowed regenerative braking amount of the second motor may be generated, based on the normal force applied to the front wheel of the vehicle and the normal force applied to the rear wheel of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
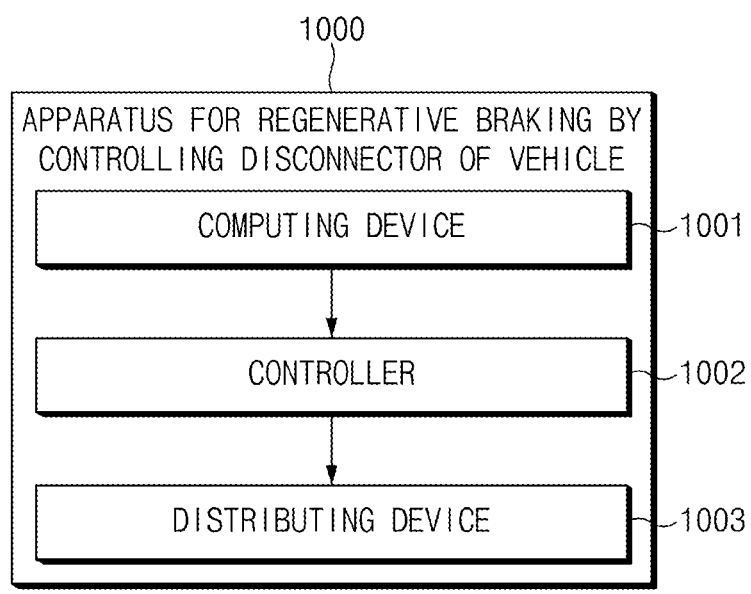
FIG. 1 is a view illustrating an apparatus for performing regenerative braking by controlling a disconnector of a four-wheel vehicle, according to embodiments.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In addition, in the following description of components according to an embodiment of the present disclosure, the terms 'first', 'second', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 5.

FIG. 1 is a view illustrating an apparatus for performing regenerative braking by controlling a disconnector of a four-wheel vehicle, according to embodiments.

FIG. 1 is a block diagram illustrating an apparatus (or simply an apparatus) 1000 for performing regenerative braking by controlling a disconnector of a four-wheel vehicle, according to embodiments.

According to embodiments, a vehicle may include a four-wheel drive vehicle. According to embodiments, the four-wheel drive vehicle may indicate a vehicle which may drive all front wheels and rear wheels. According to embodiments, the four-wheel drive vehicle may drive all front wheels and rear wheels or any one (for example, only rear wheels) of front wheels or rear wheels full-time or part-time.

In addition, according to embodiments, the vehicle may include at least one of an electric vehicle (EV), a hybrid electric vehicle (HEV) or a plug-in hybrid electric vehicle (PHEV). Therefore, according to embodiments, the vehicle may include a battery for the vehicle. The vehicle according to embodiment may utilize regenerative braking by using the battery for the vehicle, to improve the energy efficiency or the fuel efficiency.

According to embodiments, a four-wheel drive electric vehicle may include a motor (a first motor) which drives a front wheel of the vehicle and a motor (a second motor) which drives a rear wheel of the vehicle. In other words, the vehicle according to the embodiments may include at least one motor. In addition, according to embodiments, the four-wheel drive electric vehicle may perform regenerative braking based on the front wheels and/or rear wheels of the vehicle. However, regenerative braking using only one motor may be advantageous for fuel efficiency, and regenerative braking using both two motors may be advantageous for fuel efficiency, depending on the braking condition of the vehicle. Therefore, according to embodiments, the apparatus may perform proper regenerative braking, based on one motor or two motors, by considering the braking condition of the vehicle.

According to embodiments the vehicle may include a disconnector. According to embodiments, the disconnector may transmit driving force, which is generated from a motor (for example, a first motor and/or a second motor) to the front wheels or the rear wheels of the vehicle. According to embodiments, when the disconnector is released, the apparatus (or the vehicle) may perform braking by utilizing regenerative braking of only one motor (for example, the second motor to drive the rear wheels). According to embodiments, when the disconnector is engaged, the apparatus (or the vehicle) may perform the braking of the vehicle by utilizing regenerative braking of two motors (for example, a first motor or a second motor). In other words, according to embodiments, the apparatus may properly utilize the regenerative braking by engaging or releasing the disconnector depending on the braking condition.

According to embodiments, the apparatus 1000 may include a processor and an associated non-transitory memory storing software instructions which, when executed by the processor, provides the functionalities of a computing device 1001, a controller 1002, and/or a distributing device 1003. Here, each of the elements of the apparatus 1000 may process signals communicated between the computing device 1001, the controller 1002, and/or the distributing device 1003. The processor may take the form of one or more processor(s) and associated memory storing program instructions. According to embodiments, the apparatus 1000 may further include at least one element which is not illustrated in the drawing.

According to embodiments, the computing device 1001 may calculate a braking amount necessary for braking, in response to inputting braking into the vehicle. According to embodiments, the inputting of braking into the vehicle may refer to that at least one operation is performed with respect to the vehicle to decelerate the vehicle. According to embodiments, the braking may be input into the vehicle by a driver or by an autonomous driving system of the vehicle.

For example, the computing device 1001 may calculate the braking amount necessary for braking the vehicle based on pressure applied to a brake pedal and/or a speed of manipulating the brake pedal, when the driver manipulates the brake pedal. For example, the computing device 1001 may calculate a braking amount necessary for braking the vehicle, in response to manipulating an engine brake of the vehicle.

According to embodiments, the controller 1002 may engage or release the disconnector of the vehicle, based on the calculated braking amount. The procedure that the controller 1002 engages or releases the disconnector according to embodiments will be described with reference to FIG. 2A and FIG. 2B.

According to embodiments, the distributing device 1003 may distribute the regenerative braking amount necessary for the braking into at least one motor included in the vehicle, when the disconnector is engaged or released. For example, the distributing device 1003 may properly distribute the regenerative braking into the first motor and the second motor, depending on the braking condition.

According to the embodiments, the apparatus may improve the energy efficiency and the fuel efficiency by properly distributing the regenerative braking, which is necessary in braking, into motors depending on the braking condition, when braking the four-wheel drive vehicle, through the method described with reference to the drawings. In addition, the apparatus 1000 may properly determine the number of motors to be utilized for regenerative braking, by engaging or releasing the disconnector of the vehicle when braking the vehicle, such that the braking is efficiently and safely performed.

FIG. 2A is a view illustrating the procedure of engaging or releasing a disconnector and FIG. 2B is a braking map illustrating a relationship between a speed of manipulating a brake pedal and a braking amount, according to embodiments.

The drawing illustrates the procedure of engaging or releasing a disconnector (a disconnector described with reference to FIG. 1), according to embodiments. As described above with reference to FIG. 1, according to the embodiments, the controller 1002 may engage or release the disconnector, based on the calculated braking amount.

According to embodiments, the controller 1002 may engage the disconnector, when at least one of a first condition or a second condition is satisfied. In addition, according to embodiments, the controller 1002 may release the disconnector, when each of the first condition and the second condition is not satisfied.

According to embodiments, the first condition and/or the second condition may indicate conditions for engaging the disconnector of the vehicle. According to embodiments, the first condition may be satisfied based on at least one of the calculated braking amount or the speed (as described with respect to FIG. 1) of manipulating the brake pedal. According to embodiments, the second condition may be satisfied based on an energy recovery amount based on the regenerative braking. According to embodiments, the energy recovery amount based on the regenerative braking may be indicate a value based on a battery charge amount, which is charged as the regenerative braking is performed, when the regenerative braking necessary for braking is performed.

Reference number 2000 illustrates the procedure of controlling a disconnector by a controller, according to embodiments, As described with reference to FIG. 1, the computing device may calculate a braking amount necessary for braking (S2001), in response to inputting braking into the vehicle (S2000). According to embodiments, the controller may engage or release the disconnector, based on at least one of the calculated braking amount, the speed of manipulating the brake pedal, or the energy recovery amount based on the regenerative braking necessary for braking (S2002).

Reference number 2001 is a graph illustrating the first condition according to embodiments.

On the graph indicated by reference number 2001, an x axis represents the calculated braking amount, and a y axis may represent the speed of manipulating the brake pedal.

According to embodiments, whether the first condition is satisfied may be determined, based on the area of the graph indicated by reference numeral 2001. According to embodiments, the graph may be variously named a "braking map", and so on.

According to embodiments, the graph is divided into four sections (for example, a first section to a fourth section).

According to embodiments, the first section 2001*a* a may indicate a section in which the speed of manipulating the brake pedal is higher than a first value ("c" value) and the calculated braking amount is less than or equal to a second value ("a" value). In other words, according to embodiments, the first section may represent an initial stage of a braking process, in which the speed of manipulating the brake pedal is higher, and a section in which the braking amount is increased in the near future with higher probability.

According to embodiments, the section 2001*b* may represent the section in which the speed of manipulating the brake pedal is equal to or lower than the first value, and the calculated braking amount is less than or equal to a second value. In other words, according to embodiments, the second section may represent the section having the less braking amount and the low speed of manipulating the brake pedal.

According to embodiments, the third section 2001*c* may represent the section in which the calculated braking amount is greater than the second value and less than or equal to a third value ("b" value). In other words, according to embodiments, the third section may represent a braking stage of requiring the deceleration of the vehicle.

According to embodiments, the fourth section 2001*d* may represent the section in which the calculated braking amount is greater than the third value. In other words, according to embodiments, the fourth section may represent a braking stage of requiring the higher deceleration of the vehicle. For example, the fourth section is a section for making an anti-lock brake system (ABS) to be ready to operate.

According to embodiments, the first condition may be satisfied in the first section and the third section. According to embodiments, the first condition may not be satisfied in the second section and the fourth section. In other words, according to embodiments, the controller 1002 may engage the disconnector in the first section and the third section. In addition, the controller 1002 may release the disconnector of the vehicle in the second section and the fourth section.

According to embodiments, the second condition may be satisfied based on an energy recovery amount based on the regenerative braking, as described above.

As described above with reference to FIG. 1, according to embodiments, the vehicle may include the first motor and the second motor, and each of the first motor and the second motor may drive any one of a front wheel or a rear wheel.

According to embodiments, the energy recovery amount based on the regenerative braking may be indicate a value based on a battery charge amount, which is charged as the regenerative braking is performed, when the regenerative braking necessary for braking is performed. In addition, as described above with reference to FIG. 1, according to embodiments, the regenerative braking may be applied to one motor or two motors. Therefore, according to embodiments, the energy recovery amount based on the regenerative braking may include an energy recovery amount of any one of the first motor or the second motor, and/or energy recovery amounts based on the regenerative braking of the first motor and the second motor.

According to embodiments, the second condition may be satisfied, when the energy recovery amount based on the regenerative braking of the first motor and the second motor is greater than the energy recovery amount of any one of the first motor or the second motor. In other words, the controller 1002 may engage the disconnector of the vehicle, when the second condition is satisfied.

According to the embodiments, the apparatus may improve the energy efficiency and the fuel efficiency by properly distributing the regenerative braking, which is necessary in braking, into motors depending on the braking condition, when braking the four-wheel drive vehicle, through the method described with reference to the drawings. In addition, the apparatus 1000 may properly determine the number of motors to be utilized for regenerative braking, by engaging or releasing the disconnector of the vehicle when braking the vehicle, such that the braking is efficiently and safely performed.

Figure 3:
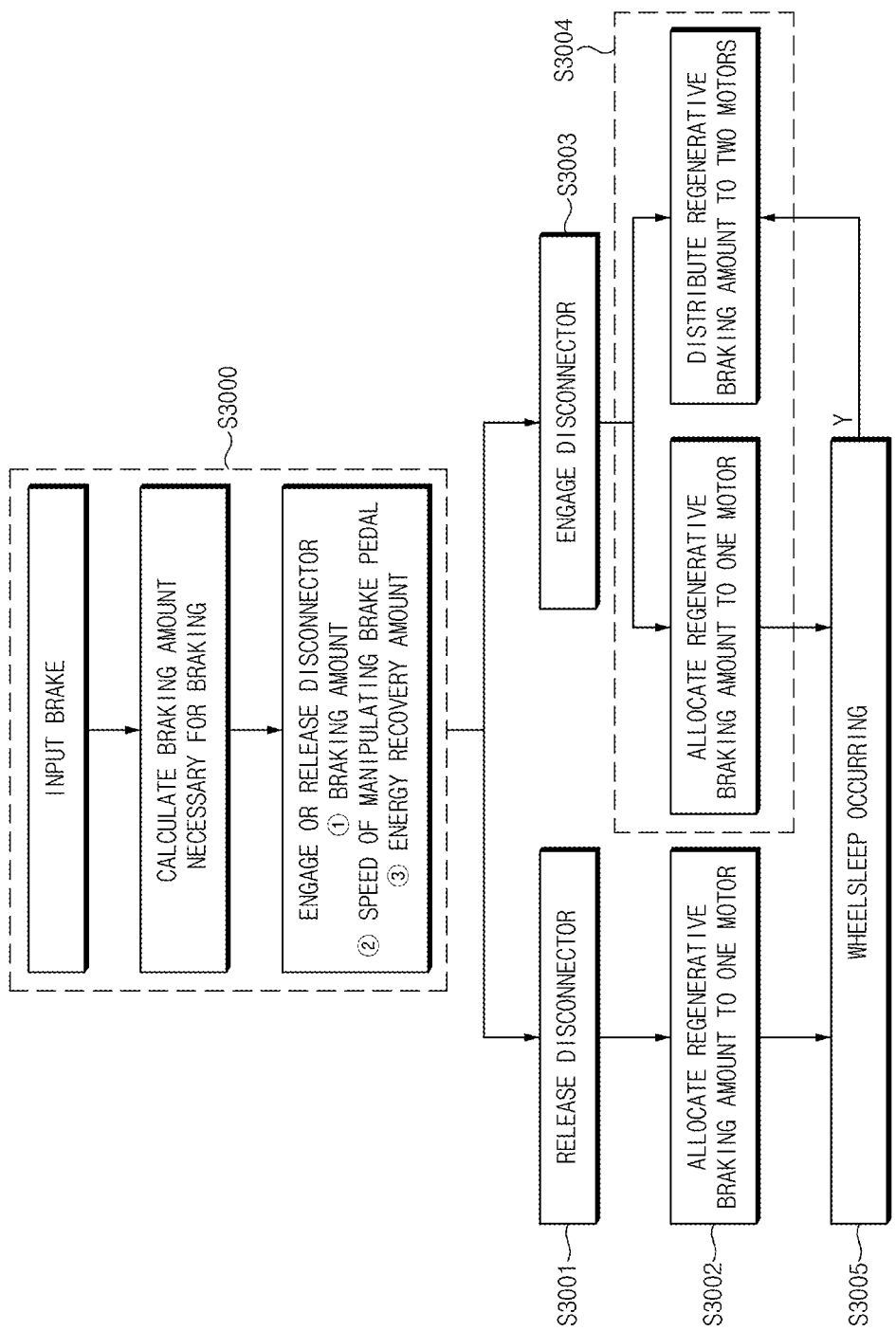
FIG. 3 is a flowchart illustrating the procedure of performing regenerative braking by controlling a disconnector of a four-wheel drive vehicle, according to embodiments.

FIG. 3 is a flowchart illustrating the procedure of performing regenerative braking by controlling a disconnector of a four-wheel drive vehicle, according to embodiments.

The drawing illustrates the procedure of performing regenerative braking by controlling a disconnector of a four-wheel drive vehicle, according to embodiments.

Herein, "S3000" may correspond to S2000 to S2002 described above with reference to FIG. 2A.

As described above with reference to FIGS. 1 to 2, according to embodiments, the controller may release a disconnector of the vehicle (S3001) or may engage the disconnector of the vehicle (S3003).

As described above with reference to FIG. 1, according to embodiments, the distributing device may distribute a regenerative braking amount necessary for braking into at least one motor (for example, the first motor and the second motor described with reference to FIGS. 1 to 2) included in the vehicle, when the disconnector is engaged or released.

As described above with reference to FIG. 1, when the disconnector is released, the vehicle may perform the regenerative braking, based on one motor. Accordingly, the distributing device may allocate the regenerative braking amount necessary for braking to any one of the first motor or the second motor, when the disconnector is released (S3002).

As described above with reference to FIG. 1, when the disconnector is engaged, the vehicle may perform the regenerative braking, based on two motors. However, in this case, the regenerative braking amount may be properly allocated to one motor or two motors, based on the fuel efficiency of the vehicle or the stability in braking of the vehicle (S3004).

According to embodiments, the procedure that the distributing device distributes a regenerative braking amount to one motor or two motors based on the fuel efficiency of the vehicle or the stability in braking of the vehicle will be described below with reference to FIG. 4.

In addition, according to various embodiments, the controller may engage the disconnector again, when a wheel slip of the vehicle occurs, even though the disconnector is released (S3005). In other words, as the number of wheels, to which the regenerative braking is applied, is increased when the disconnector is coupled, the wheel slip may be reduced, as compared to that the regenerative braking is performed only by using the rear wheel (two wheels).

In addition, according to embodiments, the distributing device may distribute the regenerative braking amount to two motors again, when the wheel slip of the vehicle occurs, even if the regenerative braking amount is applied only one motor (S3005).

According to the embodiments, the apparatus may improve the energy efficiency and the fuel efficiency by properly distributing the regenerative braking, which is necessary in braking, into motors depending on the braking condition, when braking the four-wheel drive vehicle, through the method described with reference to the drawings. In addition, the apparatus may properly determine the number of motors to be utilized for regenerative braking, by engaging or releasing the disconnector of the vehicle when braking the vehicle, such that the braking is efficiently and safely performed.

Figure 4:
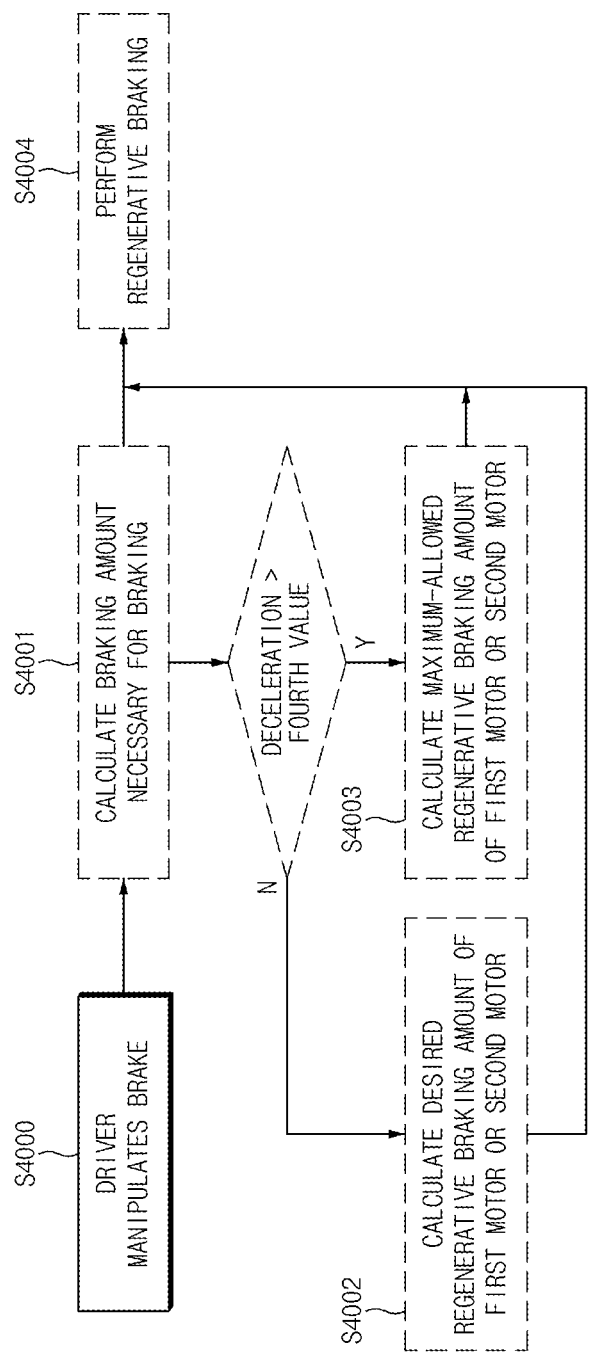
FIG. 4 is a flowchart illustrating the procedure of distributing a regenerating braking amount necessary for braking, according to embodiments.

FIG. 4 is a flowchart illustrating the procedure of distributing a regenerating braking amount necessary for braking, according to embodiments.

The drawing illustrates the procedure that the distributing device distributes a regenerating braking amount necessary for braking, according to embodiments.

As described above with reference to FIG. 3, even when the disconnector of the vehicle is engaged, the regenerative braking amount may be properly distributed into one motor or two motors, based on the fuel efficiency or the braking stability of the vehicle. For example, the distributing device may distribute the regenerative braking amount by first considering the fuel efficiency of the vehicle, or may distribute the regenerative braking amount by first considering stability in braking.

Figure 2:
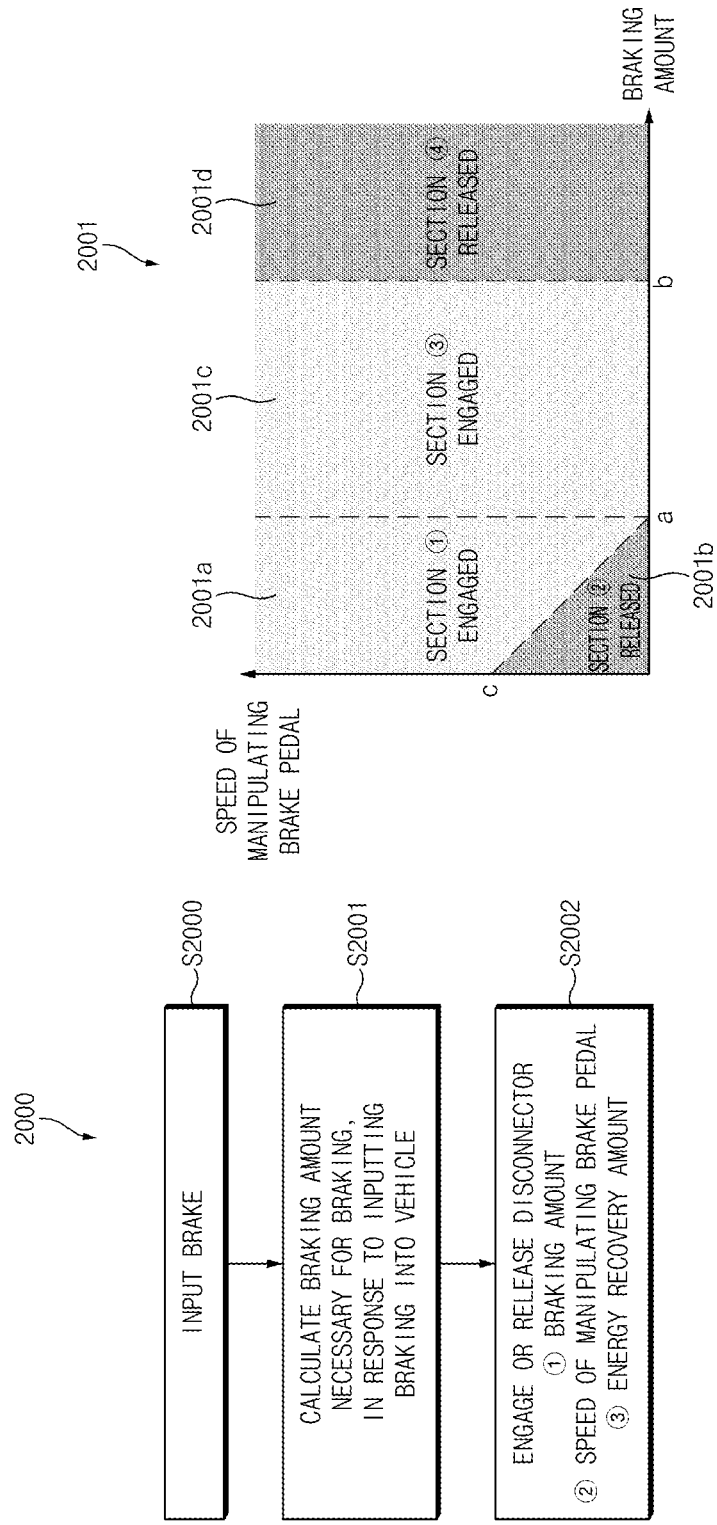
FIG. 2A is a view illustrating the procedure of engaging or releasing a disconnector and FIG. 2B is a braking map illustrating a relationship between a speed of manipulating a brake pedal and a braking amount, according to embodiments.

Herein, "S4000" to "S4001" may correspond to the procedure of calculating the regenerative braking amount necessary for braking, in response to inputting the braking into the vehicle as described in FIGS. 1 to 3.

According to embodiments, the distributing device may distribute the regenerative braking amount, based on the deceleration of the vehicle. According to embodiments, the deceleration may represent an acceleration value of the vehicle, during the braking of the vehicle.

According to embodiments, when the deceleration of the vehicle is lower than or equal to a fourth value, the vehicle may be slowly decelerating. In this case, the distributing device may distribute thee regenerative braking amount by first considering the fuel efficiency of the vehicle.

According to embodiments, the fourth value may be a preset value, a value calculated by the system, or a value input by a driver of the vehicle. For example, the fourth value represents 0.3 g m/s2.

According to embodiments, the distributing device may distribute the regenerative braking amount into the first motor and the second motor, based on a desired regenerative braking amount of the first motor and a desired regenerative braking amount of the second motor, when the disconnector is engaged, and the deceleration of the vehicle is less than or equal to the fourth value (S4002).

According to embodiments, the desired regenerative braking amount may represent a regenerative braking amount required in braking under a general braking condition. Accordingly, the desired regenerative braking amount may be calculated depending on a control amount for braking, or an energy recovery amount based on the regenerative braking of the motor. In other words, the desired regenerative braking amount of the first motor and the desired regenerative braking amount of the second motor may be generated based on a calculated control amount, the energy recovery amount based on the regenerative braking of the first motor, and the energy recovery amount based on the regenerative braking of the second motor.

According to embodiments, when the deceleration of the vehicle is greater the fourth value, the vehicle may be rapidly decelerating. In this case, the distributing device may distribute thee regenerative braking amount by first considering the stability in braking of the vehicle. In other words, when the vehicle is being slowly decelerating, the regenerative braking amount of the motor may be distributed based on the fuel efficiency without causing a problem. However, when the vehicle is braked at a higher deceleration, the regenerative braking amount of the rear wheel is excessively increased, thereby causing problem in the stability of braking. Accordingly, the distributing device may distribute the regenerative braking amount, based on normal force applied to the front wheel and/or the rear wheel in braking.

According to embodiments, the distributing device may distribute the regenerative braking amount into the first motor and the second motor, based on a maximum-allowed regenerative braking amount of the first motor and a maximum-allowed regenerative braking amount of the second motor, when the disconnector is engaged, and the deceleration of the vehicle is greater than the fourth value (S4003).

According to embodiments, the maximum-allowed regenerative braking amount may refer to the maximum regenerative braking amount allowed for each motor, depending on the normal force applied to the front wheel or the rear wheel, when the vehicle is braked. Accordingly, the maximum-allowed regenerative braking amount of the first motor and the maximum-allowed regenerative braking amount of the second motor may be generated, based on the normal force applied to the front wheel of the vehicle and the normal force applied to the rear wheel of the vehicle.

According to embodiments, the vehicle (or apparatus) may perform the regenerative braking, when the regenerative braking amount is distributed to each motor by the distributing device (S4004). In this case, the vehicle may perform the regenerative braking by the distributed regenerative braking amount, within a range allowing the regenerative braking with respect to each motor based on the current state of the motor.

In FIG. 3, as described above, according to embodiments, the distributing device may distribute the regenerative braking amount to two motors again, when the wheel slip of the vehicle occurs, even if the regenerative braking amount is applied only one motor.

In other words, the distributing device may distribute the regenerative braking amount into the first motor and the second motor, based on the maximum-allowed regenerative braking amount of the first motor and the maximum-allowed regenerative braking amount of the second motor, when the disconnector is engaged, the deceleration of the vehicle is less than or equal to the fourth value, or the wheel sleep occurs in the vehicle. In this case, the maximum-allowed regenerative braking amount of the first motor and the maximum-allowed regenerative braking amount of the second motor have been already described.

In other words, according to embodiments, the vehicle (or apparatus) may properly distribute the regenerative braking amount, based on the braking condition, through the method described with reference to the drawing, thereby minimizing the hydraulic braking such that the durability of the brake may be efficiently managed.

In addition, according to the embodiments, the apparatus may improve the energy efficiency and the fuel efficiency by properly distributing the regenerative braking, which is necessary in braking, into motors depending on the braking condition, when braking the four-wheel drive vehicle, through the method described with reference to the drawings. In addition, the apparatus 1000 may properly determine the number of motors to be utilized for regenerative braking, by engaging or releasing the disconnector of the vehicle when braking the vehicle, such that the braking is efficiently and safely performed.

Figure 5:
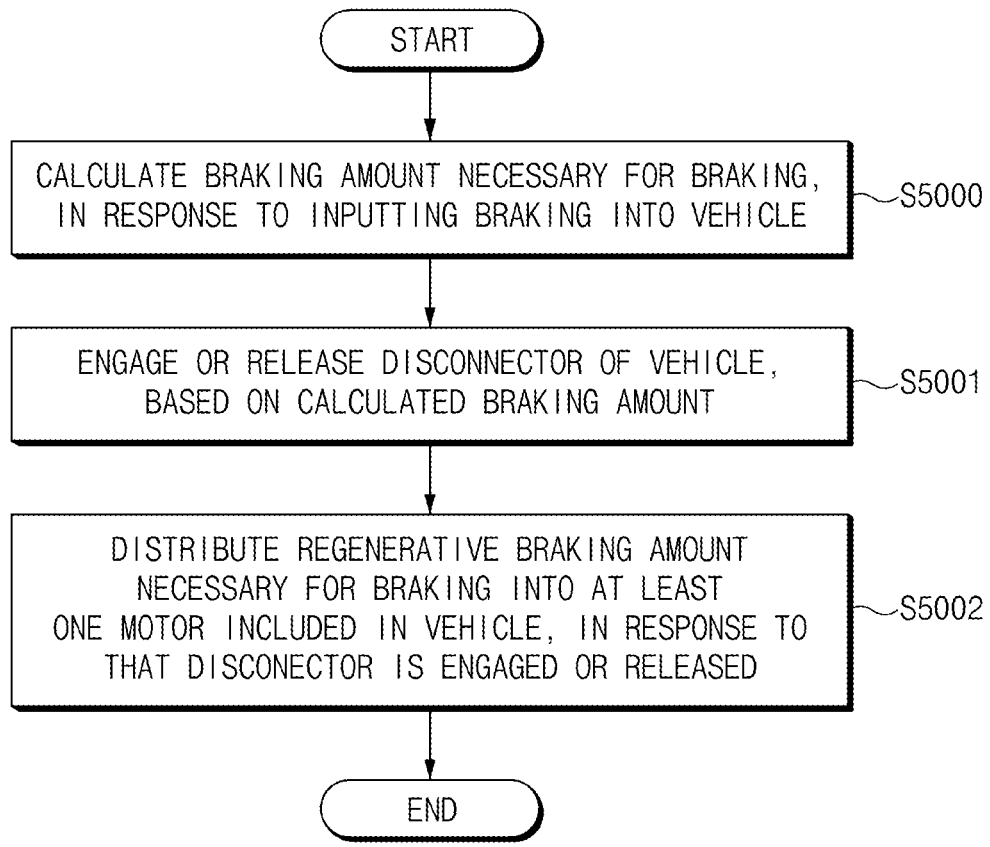
FIG. 5 is a flowchart illustrating a method for performing regenerative braking by controlling a disconnector of a four-wheel drive vehicle, according to embodiments.

FIG. 5 is a flowchart illustrating a method for performing regenerative braking by controlling a disconnector of a four-wheel drive vehicle, according to embodiments.

The drawing is a flowchart illustrating a method (or simply a method) for performing regenerative braking by controlling a disconnector of the four-wheel drive vehicle, according to various embodiments. The apparatus described with reference to FIGS. 1 to 4, may perform the method described with reference to the drawing.

According to the embodiment, the method may include calculating a braking amount necessary for braking, in response to inputting braking into a vehicle (S5000), engaging or releasing a disconnector of the vehicle, based on the calculated braking amount (S5001), and distributing the regenerative braking amount necessary for the braking into at least one motor included in the vehicle, when the disconnector is engaged or released (S5002). According to embodiments, the method may further include at least one step which is not illustrated.

According to embodiments, "S5000" may be performed by the computing device 1001 of FIG. 1. According to embodiments, the descriptions of the braking and the disconnector are identical to or similar to those described with reference to FIGS. 1 and 4.

According to embodiments, "S5001" may include engaging the disconnector, when at least one of the first condition or the second condition is satisfied, and releasing the disconnector, when each of the first condition and the second condition is not satisfied. According to embodiments, the description of the first condition and the second condition are identical to or similar to the above description.

According to embodiments, "S5001" may further include engaging or releasing the disconnector, based on at least one of the calculated braking amount, the speed of manipulating the brake pedal, or the energy recovery amount based on the regenerative braking necessary for braking. The description of the above step is identical to or similar to the description made with reference to 2.

According to embodiments, the first condition may be satisfied based on at least one of the calculated braking amount or the speed of manipulating the brake pedal, and the second condition may be satisfied based on an energy recovery amount based on the regenerative braking. According to embodiments, the description of the calculated braking amount, the speed of manipulating the brake pedal, or the energy recovery amount based on the regenerative braking are identical to or similar to the above description made with reference to FIG. 2B.

According to embodiments, the first condition may be satisfied when the speed of manipulating the brake pedal is greater than the first value, and the calculated braking amount is less than or equal to the second value, may be satisfied when the calculated braking amount is greater than the second value and less than or equal to the third value, may not be satisfied when the calculated braking amount is greater than the third value, and may not be satisfied when the speed of manipulating the brake pedal is less than or equal to the first value, and the calculated braking amount is less than or equal to the second value. According to embodiments, the description of the first value to the third value is identical to or similar to the description made with respect to FIG. 2B.

According to embodiment, the vehicle may include the first motor and the second motor, and each of the first motor and the second motor may drive any one of a front wheel or a rear wheel. The descriptions of the first motor and the second motor may be identical to or similar to those described with reference to FIGS. 1 to 4.

According to embodiments, the energy recovery amount based on the regenerative braking may include an energy recovery amount based on the regenerative braking of any one of the first motor or the second motor, and/or an energy recovery amount based on the regenerative braking of the first motor and the second motor.

According to embodiments, the second condition may be satisfied, when the energy recovery amount based on the regenerative braking of the first motor and the second motor is greater than the energy recovery amount of any one of the first motor or the second motor.

According to embodiments, "S5002" may include allocating the regenerative braking necessary for braking to any one of the first motor or the second motor, when the disconnector is released (S3002). The description of the above step is identical to or similar to the description made with reference to FIGS. 1 to 4.

According to embodiments, "S5002" may include distributing the regenerative braking amount into the first motor and the second motor, based on the desired regenerative braking amount of the first motor and the desired regenerative braking amount of the second motor, when the disconnector is engaged, and the deceleration of the vehicle is less than or equal to the fourth value. The description of the above step is identical to or similar to the description made with reference to FIGS. 1 to 4.

According to embodiments, the desired regenerative braking amount of the first motor and the desired regenerative braking amount of the second motor may be generated based on the calculated braking amount, the energy recovery amount based on the regenerative braking of the first motor, and the energy recovery amount based on the regenerative braking of the second motor.

According to embodiments, "S5002" may distributing the regenerative braking amount into the first motor and the second motor, based on the maximum-allowed regenerative braking amount of the first motor and the maximum-allowed regenerative braking amount of the second motor, when the deceleration of the vehicle is greater than the fourth value. The description of the above step is identical to or similar to the description made with reference to FIGS. 1 to 4.

According to embodiments, the maximum-allowed regenerative braking amount of the first motor and the maximum-allowed regenerative braking amount of the second motor may be generated, based on the normal force applied to the front wheel of the vehicle and the normal force applied to the rear wheel of the vehicle.

According to embodiments, "S5001" may include engaging the disconnector, when the disconnector is released, and the wheel sleep occurs in the vehicle. The description of the above step is identical to or similar to the description made with reference to FIGS. 1 to 4.

According to embodiments, "S5002" may further include distributing the regenerative braking amount into the first motor and the second motor, based on the maximum-allowed regenerative braking amount of the first motor and the maximum-allowed regenerative braking amount of the second motor, when the disconnector is engaged, the deceleration of the vehicle is less than or equal to the fourth value, or the wheel sleep occurs in the vehicle According to embodiments, the maximum-allowed regenerative braking amount of the first motor and the maximum-allowed regenerative braking amount of the second motor may be generated, based on the normal force applied to the front wheel of the vehicle and the normal force applied to the rear wheel of the vehicle.

According to embodiments, the regenerative braking may be properly performed based on the braking condition of the vehicle.

In addition, according to various embodiments, regenerative braking may be properly distributed into the front wheel or the rear wheel by controlling the disconnector of the vehicle.

Besides, a variety of effects directly or indirectly understood through the disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for performing regenerative braking by controlling a disconnector of a vehicle, the apparatus comprising:
a non-transitory memory storing program instructions; and
a processor configured to execute the program instructions, wherein the program instructions, when executed, cause the processor to:
calculate a braking amount necessary for braking, in response to inputting the braking into the vehicle;
engage or release the disconnector of the vehicle, based on the calculated braking amount;
distribute a regenerative braking amount necessary for braking to at least one motor included in the vehicle, when the disconnector is engaged or released;
engage the disconnector, when at least one of a first condition or a second condition is satisfied; and
release the disconnector, when each of the first condition and the second condition is not satisfied,
wherein the first condition is satisfied when:
a speed of manipulating a brake pedal is greater than a first value, and the calculated braking amount is less than or equal to a second value; and
the calculated braking amount is greater than the second value and less than or equal to a third value, and
wherein the first condition is not satisfied when:
the calculated braking amount is greater than the third value; and
the speed of manipulating the brake pedal is less than or equal to the first value, and the calculated braking amount is less than or equal to the second value.

2. The apparatus of claim 1, wherein the vehicle includes:
a first motor and a second motor,
wherein each of the first motor and the second motor drives one of a front wheel or a rear wheel,
wherein the energy recovery amount based on the regenerative braking includes:
an energy recovery amount according to regenerative braking of one of the first motor or the second motor, and an energy recovery amount according to regenerative braking of the first motor and the second motor, and
wherein the second condition is satisfied, when:
the energy recovery amount according to the regenerative braking of the first motor and the second motor is greater than the energy recovery amount of one of the first motor or the second motor.

3. The apparatus of claim 2, wherein the program instructions further cause the processor to allocate the regenerative braking amount necessary for the braking to one of the first motor or the second motor, when the disconnector is released.

4. The apparatus of claim 2, wherein the program instructions further cause the processor to distribute the regenerative braking amount to the first motor and the second motor, based on a desired regenerative braking amount of the first motor and a desired regenerative braking amount of the second motor, when the disconnector is engaged, and a deceleration of the vehicle is less than or equal to a fourth value, and
wherein the desired regenerative braking amount of the first motor and the desired regenerative braking amount of the second motor are generated based on the calculated braking amount, the energy recovery amount according to the regenerative braking of the first motor, and the energy recovery amount based on the regenerative braking of the second motor.

5. The apparatus of claim 2, wherein the program instructions further cause the processor to distribute the regenerative braking amount to the first motor and the second motor, based on a maximum-allowed regenerative braking amount of the first motor and a maximum-allowed regenerative braking amount of the second motor, when the disconnector is engaged, and the deceleration of the vehicle is greater than a fourth value, and
wherein the maximum-allowed regenerative braking amount of the first motor and the maximum-allowed regenerative braking amount of the second motor are generated, based on normal force applied to the front wheel of the vehicle and normal force applied to the rear wheel of the vehicle.

6. The apparatus of claim 1, wherein the program instructions further cause the processor to:
engage the disconnector, when the disconnector is released and a wheel slip of the vehicle occurs.

7. The apparatus of claim 4, wherein the program instructions further cause the processor to distribute the regenerative braking amount to the first motor and the second motor, based on a maximum-allowed regenerative braking amount of the first motor and a maximum-allowed regenerative braking amount of the second motor, when the disconnector is engaged, the deceleration of the vehicle is less than or equal to the fourth value, or the wheel sleep occurs in the vehicle, and
wherein the maximum-allowed regenerative braking amount of the first motor and the maximum-allowed regenerative braking amount of the second motor are generated, based on normal force applied to the front wheel of the vehicle and normal force applied to the rear wheel of the vehicle.

8. A method for performing regenerative braking by controlling a disconnector of a fourth-wheel vehicle, the method comprising:
calculating a braking amount necessary for braking, in response to inputting the braking into a vehicle;
engaging or releasing the disconnector of the vehicle, based on the calculated braking amount; and
distributing the regenerative braking amount necessary for the braking to at least one motor included in the vehicle, when the disconnector is engaged or released,
wherein the engaging or releasing of the disconnector of the vehicle includes:
engaging the disconnector, when at least one of a first condition or a second condition is satisfied; and
releasing the disconnector, when each of the first condition and the second condition is not satisfied, and
wherein the first condition is satisfied when:
a speed of manipulating a brake pedal is greater than a first value, and the calculated braking amount is less than or equal to a second value; and
the calculated braking amount is greater than the second value and less than or equal to a third value, and
wherein the first condition is not satisfied when:
the calculated braking amount is greater than the third value; and
the speed of manipulating the brake pedal is less than or equal to the first value, and the calculated braking amount is less than or equal to the second value.

9. The method of claim 8, wherein the vehicle includes:
a first motor and a second motor,
wherein each of the first motor and the second motor drives one of a front wheel or a rear wheel,
wherein the energy recovery amount based on the regenerative braking includes:
an energy recovery amount based on regenerative braking of one of the first motor or the second motor, and an energy recovery amount based on regenerative braking of the first motor and the second motor, and
wherein the second condition is satisfied, when:
the energy recovery amount based on the regenerative braking of the first motor and the second motor is greater than the energy recovery amount of one of the first motor or the second motor.

10. The method of claim 9, wherein the distributing includes:
allocating the regenerative braking amount necessary for the braking to one of the first motor or the second motor, when the disconnector is released.

11. The method of claim 9, wherein the distributing includes:
distributing the regenerative braking amount to the first motor and the second motor, based on a desired regenerative braking amount of the first motor and a desired regenerative braking amount of the second motor, when the disconnector is engaged, and a deceleration of the vehicle is less than or equal to a fourth value, and
wherein the desired regenerative braking amount of the first motor and the desired regenerative braking amount of the second motor are generated based on the calculated braking amount, the energy recovery amount according to the regenerative braking of the first motor, and the energy recovery amount based on the regenerative braking of the second motor.

12. The method of claim 9, wherein the distributing includes:
distributing the regenerative braking amount to the first motor and the second motor, based on a maximum-allowed regenerative braking amount of the first motor and a maximum-allowed regenerative braking amount of the second motor, when the disconnector is engaged, and the deceleration of the vehicle is greater than a fourth value, and
wherein the maximum-allowed regenerative braking amount of the first motor and the maximum-allowed regenerative braking amount of the second motor are generated, based on normal force applied to the front wheel of the vehicle and normal force applied to the rear wheel of the vehicle.

13. The method of claim 8, wherein the engaging or the releasing of the disconnector of the vehicle includes:
engaging the disconnector, when the disconnector is released and a wheel slip of the vehicle occurs.

14. The method of claim 11, wherein the distributing includes:
distributing the regenerative braking amount to the first motor and the second motor, based on a maximum-allowed regenerative braking amount of the first motor and a maximum-allowed regenerative braking amount of the second motor, when the disconnector is engaged, the deceleration of the vehicle is less than or equal to the fourth value, or the wheel sleep occurs in the vehicle, and wherein the maximum-allowed regenerative braking amount of the first motor and the maximum-allowed regenerative braking amount of the second motor are generated, based on normal force applied to the front wheel of the vehicle and normal force applied to the rear wheel of the vehicle.

\* \* \* \* \*